United States Patent [19]

Enomoto et al.

[11] Patent Number: 5,329,801
[45] Date of Patent: Jul. 19, 1994

[54] PRESS DIE SET

[75] Inventors: Nobuo Enomoto; Toshio Wada; Kazuyoshi Umeya; Kazuo Yamada; Koki Okanda, all of Yamanashi, Japan

[73] Assignee: Enomoto Co., Ltd., Uenohara, Japan

[21] Appl. No.: 47,142

[22] Filed: Apr. 13, 1993

[30] Foreign Application Priority Data

Apr. 20, 1992 [JP] Japan .................................. 4-126903
Apr. 20, 1992 [JP] Japan .................................. 4-126904
Oct. 28, 1992 [JP] Japan ............................. 4-080265[U]

[51] Int. Cl.$^5$ ............................................. B21D 37/10
[52] U.S. Cl. ........................................ 72/456; 384/30; 384/47
[58] Field of Search ....................... 384/30, 47; 72/456

[56] References Cited

U.S. PATENT DOCUMENTS

| | | | |
|---|---|---|---|
| 2,830,409 | 4/1958 | Northcutt | 384/47 |
| 3,029,110 | 4/1962 | Hughes | 384/30 |
| 4,699,522 | 10/1987 | Engel et al. | 384/47 |
| 4,746,228 | 5/1988 | Shimo | 384/47 |

FOREIGN PATENT DOCUMENTS

| | | |
|---|---|---|
| 167515 | 10/1982 | Japan . |
| 13223 | 1/1983 | Japan . |
| 256018 | 11/1986 | Japan . |
| 81036 | 4/1991 | Japan . |

Primary Examiner—David Jones
Attorney, Agent, or Firm—Brumbaugh, Graves, Donohue & Raymond

[57] ABSTRACT

A sliding bearing assembly for a press die set includes a guide post having at least two external grooves disposed parallel to the post axis, each of which has two flat surfaces oriented at 90 degrees to one another. A guide bushing is slidably mounted on the post by guide blocks and a retainer assembly. The guide bushing includes a number of guide blocks equal to the number of grooves in the guide post, and each has a groove opposed to a corresponding groove in the post. The retainer assembly, which is positioned within the guide bushing, includes at least two cross roller bearings, one for each groove on the guide post, mounted on a generally circular frame. The roller bearings are mounted on the frame with the axes of the rollers at such an angle relative to the plane of the frame that the rollers run along the aligned opposed grooves in the guide post and guide blocks.

6 Claims, 15 Drawing Sheets

PRESS DIE SET

BACKGROUND OF THE INVENTION

1. Field of the Invention

This present invention relates to a press die set used in a punching process, a bending process, a drawing process, a coining process, a forging process, a rubber die process, a mold die process, a die-cast process, a powder molding process or the like, and in particular to a slidable part such as a guide post, a retainer, and a guide bushing in the die set. Further, the present invention relates to a roller and a frame constituting a retainer.

2. Description of the Related Art

In a press die set in which upper and lower dies are vertically slidden, relative to each other, through the intermediary of guide posts, a retainer and guide bushes so as to perform a punching process.

Figure 23:
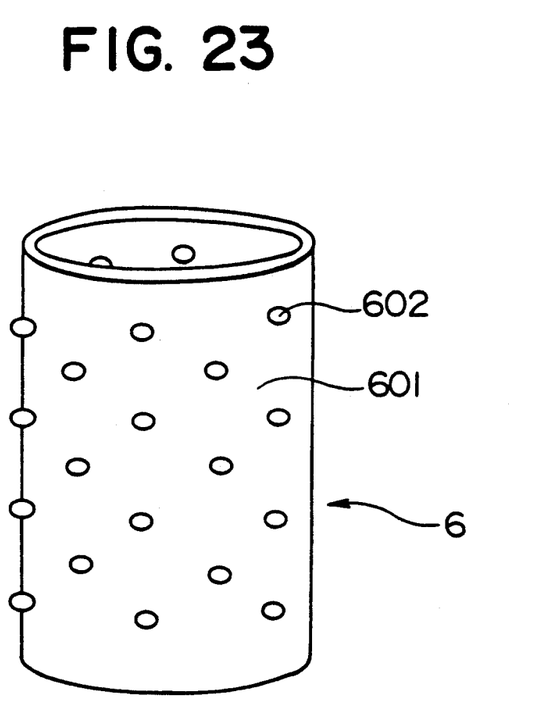
FIG. 23 is a perspective view of a conventional ball retainer for a press die set.

Conventionally, a ball retainer shown in FIG. 23 has been widely used as the above-mentioned retainer. The ball retainer has a substantially cylindrical shape plastic casing 601 in which several ball bearings 602 are rotatably held. Since the thickness of the casing 601 is less than the diameter of the ball bearings 602, the ball bearings pierce through the inside of the casing so as to make contact with a guide post while the casing does not make contact with the guide post. Similarly, the ball bearings make contact with a guide bushing which surrounds the exterior of the ball retainer. Further, when the ball bearings are rotated, the guide post, the ball retainer and the guide bushing are slidden, relative to each other.

The conventional guide post is columnar, having an outer diameter slightly smaller than the inner diameter of the retainer. Further, the conventional guide bushing is cylindrical, having an inner diameter slightly larger than the outer diameter of the retainer. Gaps between the ball bearings, the guide post and the guide bushing, are filled with lubricant such as grease so as to enable smooth slide motion.

However, since the conventional retainer uses ball bearings, and accordingly they make point-contact with the guide post and the guide bushing, the total contact area is not so large even though a larger number of ball bearings are used. Accordingly, a high pressure is exerted to the ball bearings, causing several problems such as occurrence of thread-like scratches on the guide post, breakage of a lubricant film, occurrence of friction heat, and further, in the worst case, occurrence of seizure.

Further, the individual bearings are made into point contacts with the guide post and the guide bushing, excessive play or rattling occurs, deteriorating the dimensional accuracy thereof and further the freedom thereof is very much so the positional adjustment therefore is difficult.

Further since the conventional retainer has a large frictional resistance, it inevitably requires a large force for slide motion of the die set. Further, the ball bearings are lined in an oblique direction, and accordingly, the relative motion between the guide post and the retainer is likely to effect in this oblique direction. The same is said to the relative motion between the retainer and the guide bushing. As a result, the motion of the die set is not in a true vertical direction but is added thereto with rotational motion, causing spiral motion or precession, and accordingly, an unpreferable lateral load is exerted to a punching cutter in dies, thereby possibly causing problems of breakage and abrasion.

The present invention is devised in order to solve the above-mentioned problems, and accordingly, one object of the present invention is to provide a novel press die set having high dimensional accuracy, which hardly fails during operation, and which facilitates the positional adjustment.

SUMMARY OF THE INVENTION

The object of the present invention described above can be accomplished by a press die set as defined in claim 1 of the appended claims.

Thus the press die set of the present invention is a press die set comprising:

(A) a guide post having an outer surface in which at least two right angle grooves each having two flat surfaces making an angle of 90 deg. therebetween, are formed along its axis;

(B) a retainer having a cross roller bearing; and (C) a guide bushing having an inner surface on which at least two right angle grooves each having two flat surfaces making an angle of 90 deg, are formed along its axis.

BRIEF DESCRIPTION OF THE DRAWINGS

FIGS. 1 through 22 show embodiments of the press die set of the present invention, wherein:

DESCRIPTION OF THE PREFERRED EMBODIMENTS

Hereinafter, preferred embodiments of the present invention will be described with reference to the accompanying drawings.

Figure 1:
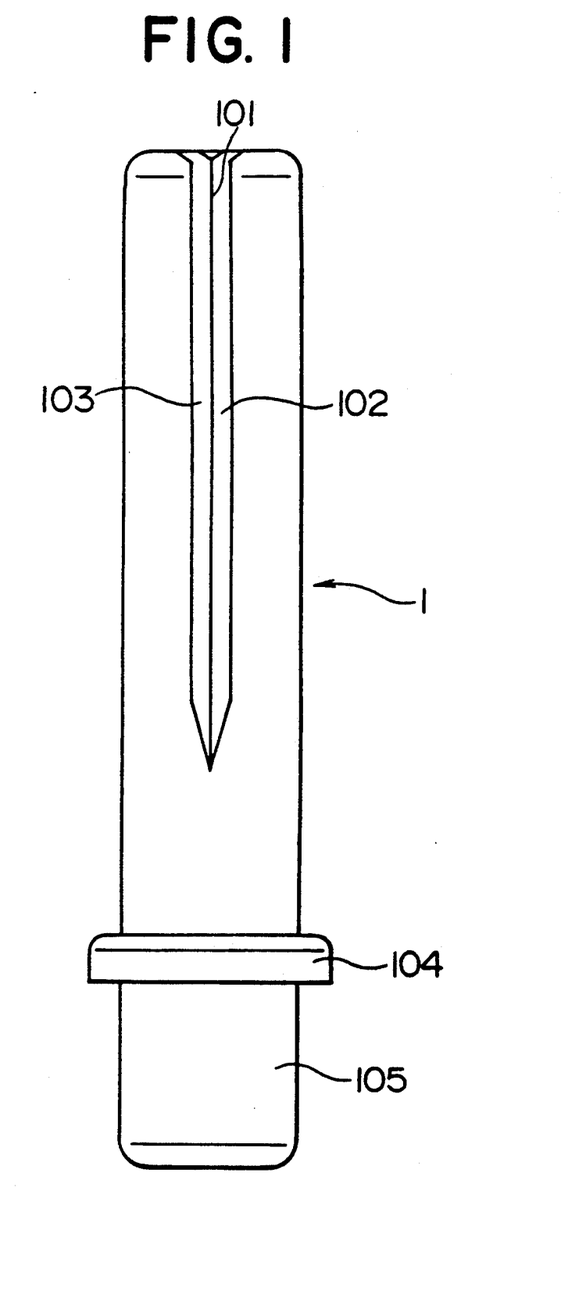
FIG. 1 is a front view illustrating a guide post of the press die set.
Figure 2:
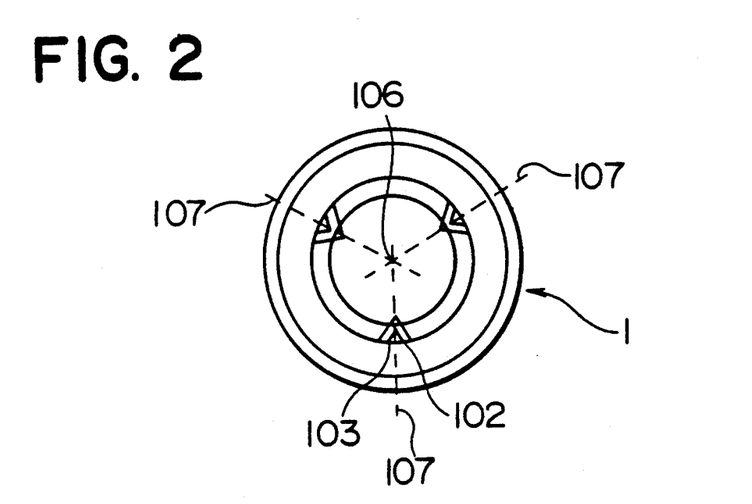
FIG. 2 is a plan view illustrating a guide post of the press die set.
Figure 3:
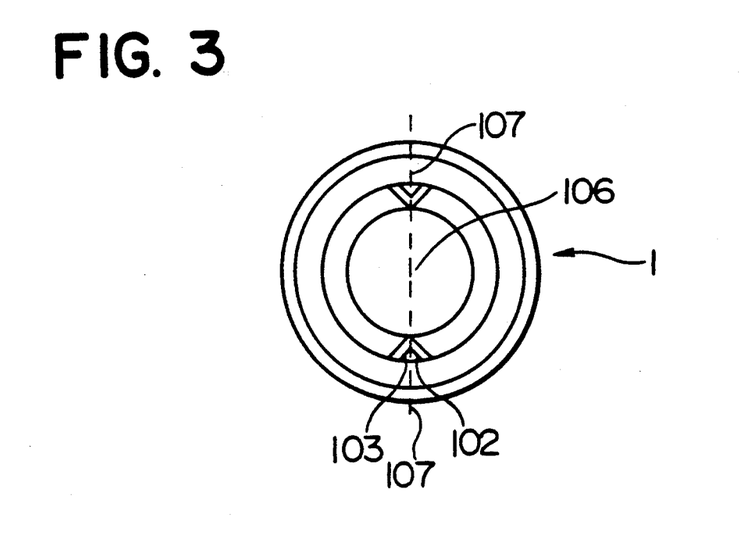
FIG. 3 is a plan view illustrating a guide post of the press die set.

FIGS. 1 and 2 are front and plan views, respectively, illustrating a guide post in an embodiment of the present invention. A guide post 1 is formed thereon with right angle grooves 101 along its axis 106. Each of the right angle grooves 101 is precisely formed so that two flat surfaces 102, 103 make a right angle therebetween. That is, the flat surfaces 102, 103 should be carefully formed so as to have a satisfactory flatness and a highly accurate angle therebetween. The guide post in this embodiment, is formed thereon with three right angle grooves along the axis 106, making an angle of 120 deg. between them. However, two right angle grooves 101 making an angle of 180 deg. therebetween, similar to those formed in a guide post in another embodiment, as shown in FIG. 3, can be also used, instead of the above-mentioned three right angle grooves. Further, in this embodiment, the right angle grooves are formed so that the bisector 107 of the angle between the flat surfaces 102, 103 passes through the center 108 of the guide post. The lower part 105 of the guide post is fitted in a hole formed in a base of the die set so that the guide post is integrally secured to the base of the die set in cooperation with a flange 104 on the guide post.

Figure 4:
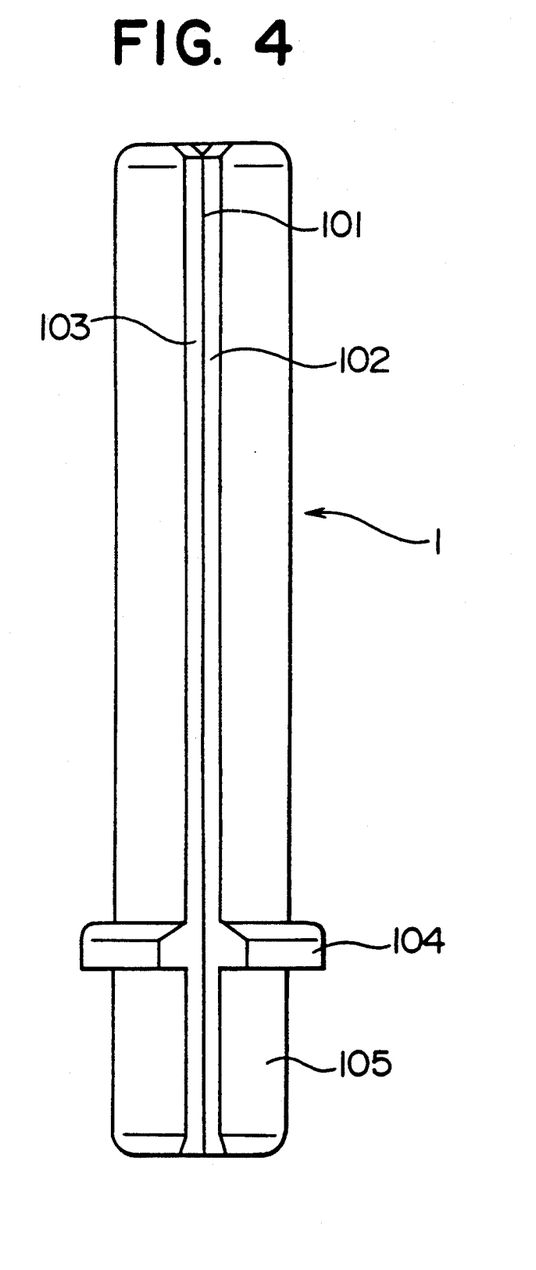
FIG. 4 is a front view illustrating a guide post of the press die set.
Figure 5:
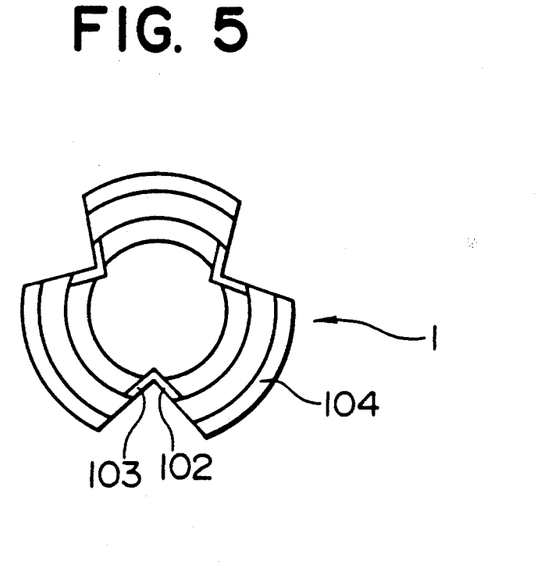
FIG. 5 is a plan view illustrating a guide post of the press die set.

FIGS. 4 and 5 are front and plan views, respectively, illustrating a guide post in another embodiment of the present invention. In this embodiment, the flange 104 on a prolongation line of the right angle groove 101 is formed therein with a cut-out. Accordingly, the right angle groove 101 can be formed in a relatively simple manner by use of an unmanned surface polishing process using an NC machine or the like.

Although it has been explained in the above-mentioned embodiments that the substantially columnar solid guide post made of high speed steel is used, a hollow cylindrical guide post can be used, instead of the above-mentioned guide post, in order to enhance the cooling effect. However, it is noted that the heating value thereof is extremely small in comparison with the conventional guide post since the guide post and cross roller bearings in the retainer uniformly and smoothly make into slidable contact with each other. As a result, even though a columnar solid guide post is used rather than a hollow cylindrical guide post, no substantially temperature rise occurs due to frictional heat even during long and continuous punching operation or the like, and accordingly, no trouble occurs.

Figure 6:
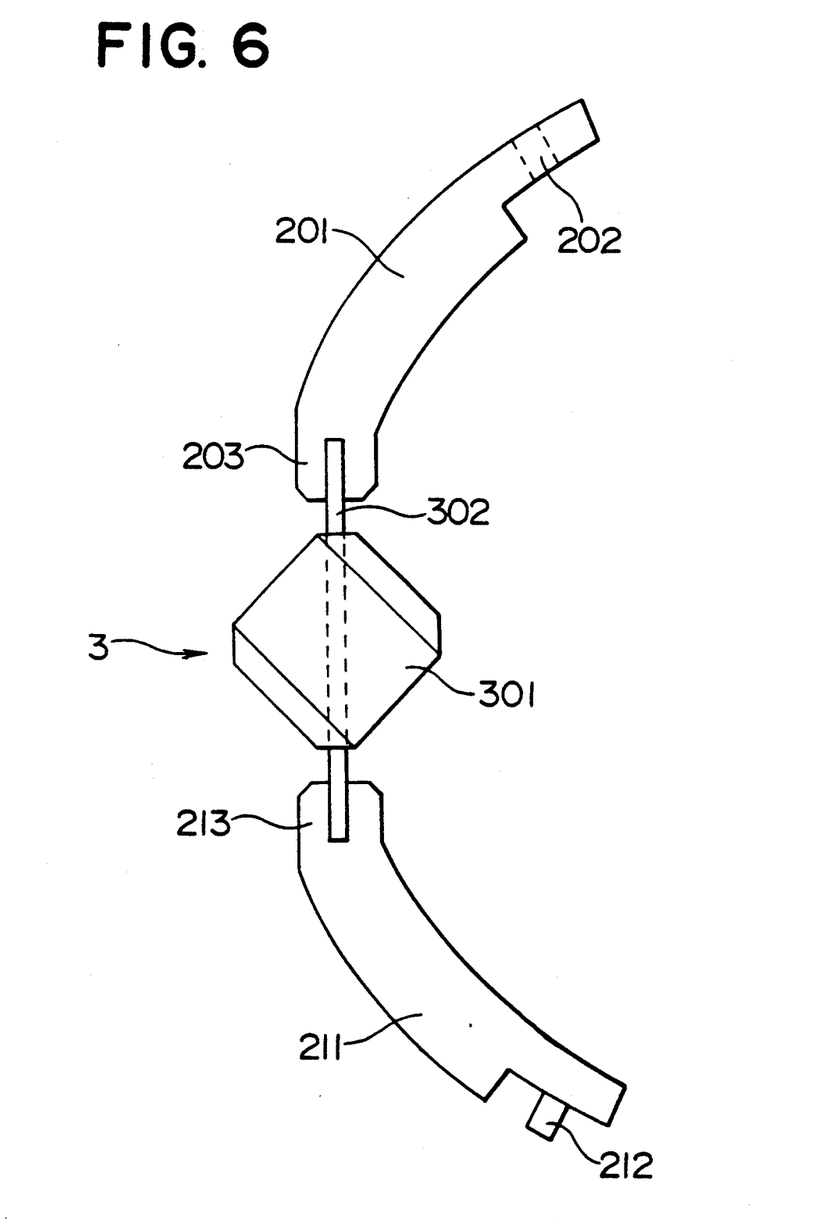
FIG. 6 is a plan view illustrating components constituting the retainer of the press die set.
Figure 7:
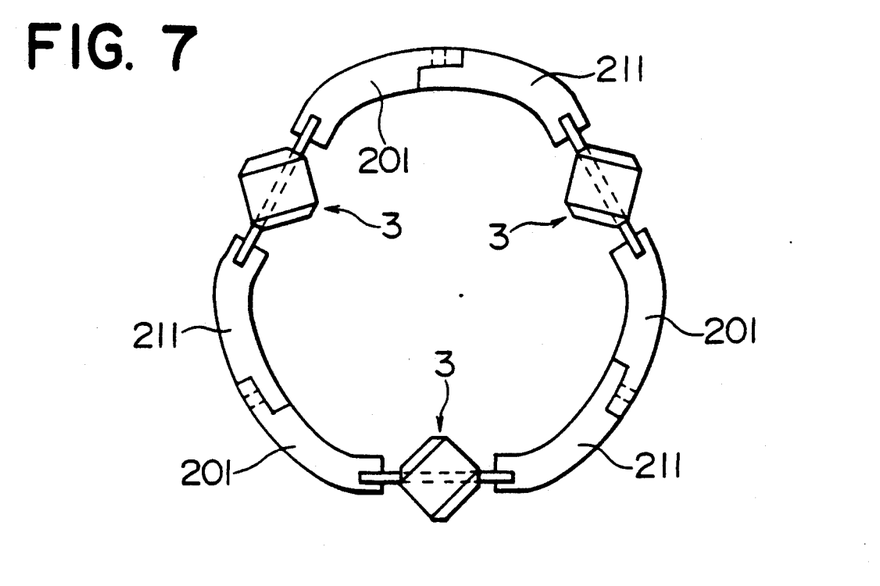
FIG. 7 is a plan view illustrating a retainer in an assembly of the press die set.
Figure 8:
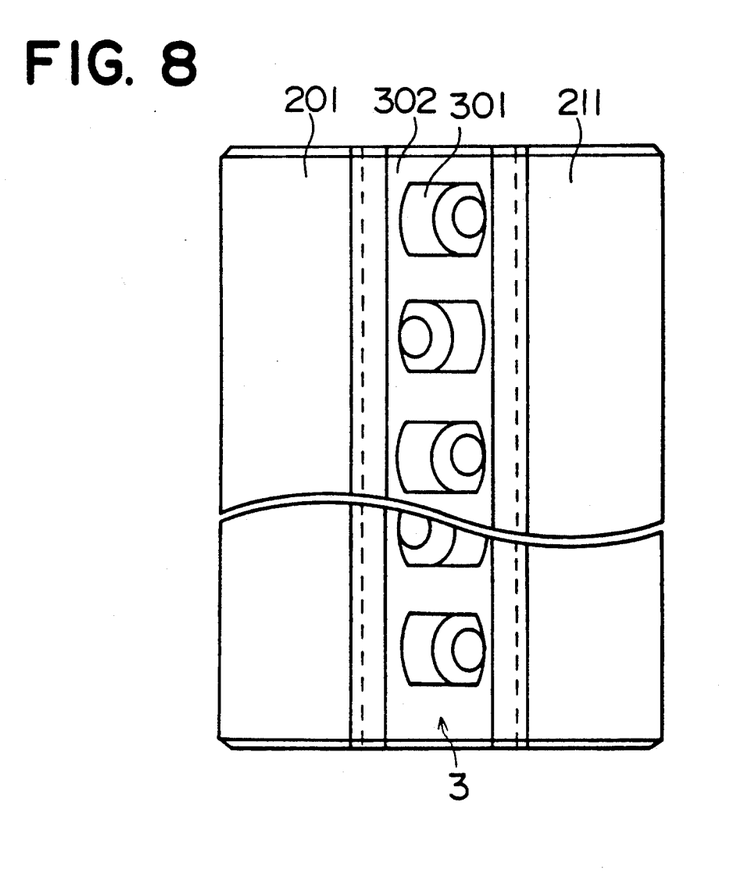
FIG. 8 is a front view illustrating a retainer in an assembly of the press die set.

FIG. 6 is a plan view illustrating components of a retainer assembly used in the above-mentioned embodiments. FIGS. 7 and 8 are plan and front views, respectively, illustrating the retainer in an assembly of these components. Cross-roller bearings 3 are arranged so that the rotational axes of each adjacent rollers 301 make an angle of 90 deg. therebetween, and are incorporated in a frame 302. The frame 302 is planar, having a rectangular shape, and is formed in its center part with an aperture in which the roller are disposed so as to be freely rotatable about their axes. One of the longer sides of the frame 302 is secured to a first coupling member 201 by means of a insert mold. That is, the first coupling member is made of resin or plastic materials, in which the edge of the longer side of the frame is embedded and secured. A concave part 202 is formed in the opposite side end of the first coupling member 201. In other words, the concave part 202 is formed in one end part of the first coupling member 201, and the other end part of the first coupling member is secured to one of the longer sides of the frame. A convex part 212 is formed in one end part of a second coupling member 211 the other end part of which is secured to the other of the longer sides of the frame. The first and second coupling members define a curve having a curvature equal to that of the retainer which becomes cylindrical after the assembly thereof.

The concave part 202 of the first coupling member 201 is fitted on the convex part 212 of the second coupling member 211 secured to the adjacent cross roller bearing so that they are coupled together in order to form a cylindrical shape.

Figure 9:
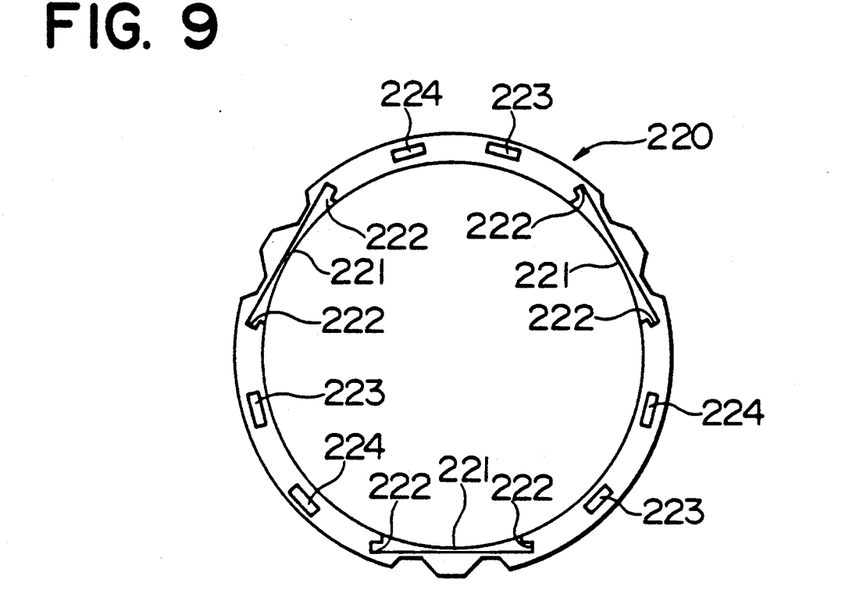
FIG. 9 is a plan view illustrating a retainer in an assembly of the press die set.
Figure 10:
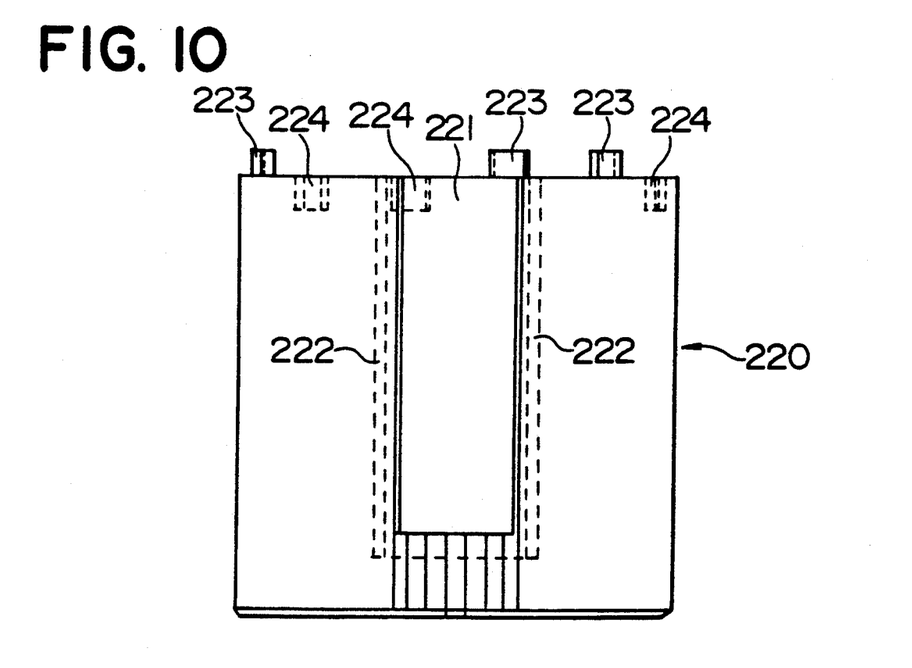
FIG. 10 is a front view illustrating a retainer in an assembly of the press die set.

Next, a retainer in another embodiment will be explained with reference to FIGS. 9, and 10. A groove 222 in which the frame of the cross roller bearing is inserted and incorporated is formed in a bottomed cylindrical coupling member 220 which is vertically splittable. The coupling member 220 is formed therein with an aperture 221 so as to allow the rollers of the cross roller bearing to be held in contact with the guide post and a guide block of the guide bushing in the die set. The crosswise width of the groove is longer than the length of the short sides of the frame of the cross roller bearing, and accordingly, the frame can have a play in the direction of the short side. Naturally, the lower end of the groove is integrally formed with a bottom surface, or is assembled thereto with a cylindrical cover in order to prevent the frame of the cross roller bearing from dropping. The other end of the coupling member is used for coupling another coupling member thereto. In this embodiment, a protrusion-like coupling part 223 and a recess-like coupling part 224 are formed, and accordingly, the protrusion-like coupling part 223 of one of the coupling members is fitted in the recess-like coupling part 224 of another of the coupling members so as to form the cylindrical retainer.

Figure 11:
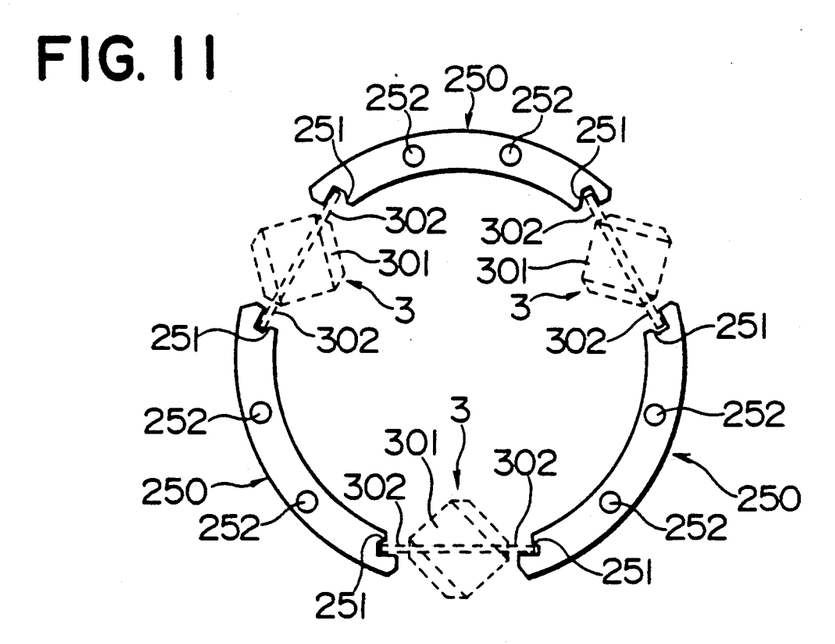
FIG. 11 is a plan view illustrating a retainer in an assembly of the press die set.
Figure 12:
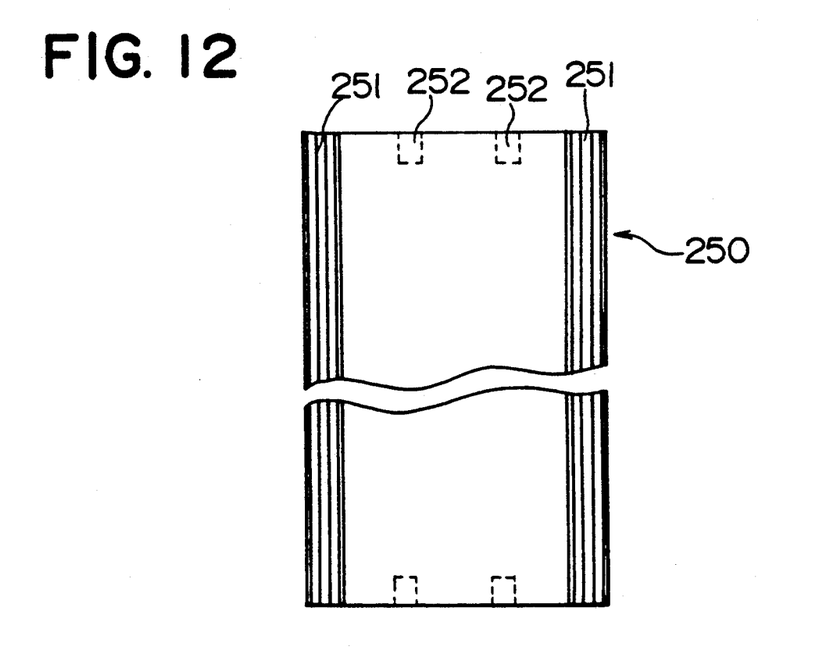
FIG. 12 is a front view illustrating a retainer in an assembly of the press die set.

Explanation will be made of a retainer in another embodiment with reference to FIGS. 11 and 12. The retainer is in the assembly of arcuated plate-like coupling members which are obtained by splitting the side surface of a cylinder, a disc-like upper end coupling member and a disc-like lower end coupling member. Further, a recess-like coupling part 252 for assembling the disc-like upper end coupling member or the disc-like lower end coupling member which are not shown is formed one end of a short side of the arcuated plate-like coupling member 250. Further, the arcuated plate-like coupling members 250 (three in number in the case shown in FIGS. 11 and 12) is assembled to the disc-like lower end coupling member. Then, the frame of the cross roller bearing is inserted and fitted along the groove. The circumferential length of the groove 251 is designed so as to be slightly longer than the width of the frame 302 which can therefore have a play after assembly. Thus, the arcuated plate-like coupling members 250 and the cross roller bearing itself define a cylindrical side surface. Finally, the disc-like upper end coupling member is assembled onto the arcuated plate-like coupling members. Instead, it is of course possible to form the retainer in such a way that the disc-like lower end coupling member and the arcuated plate-like coupling members which are beforehand integrally incorporated upon manufacture, is fitted therein with the cross-roller bearing, and then the disc-like upper end coupling member is assembled thereonto.

No specific material is required for the coupling members. That is, resin, plastics, ceramic, hard rubber, metal, sintered material or the like can be used therefor.

A commercially available cross roller bearing can be used. However, if a conventional cross roller bearing is used in a slide part which performs linear motion in a vertical direction, that is, which moves repeatedly up and down, a force corresponding to the product of the weight of the cross roller bearing and an acceleration is exerted to a contact part between pawls of a frame and rollers, and accordingly, the rollers are eccentrically worn due to abrasion with the pawls. Thus, if it is repeatedly used, a play is likely to occur between the rollers and the frame. As a result, (1) a problem of lowering the positional accuracy occurs, (2) a problem of speeding up the abrasion of the rollers occurs due to that the roller touches an aperture in the frame, and (3) a problem of come-off of the roller from the frame, which inevitably cause a problem of failures, in sliding, of a machine, equipment or the like. These problems are serious in the case of repetitions of slide motion at a high speed. When a conventional cross roller was used in a die press machine, a rattling occurred after 600,000 to 2,000,000 strokes.

Further, most of conventionally rollers are columnar, and a periphery which is the boundary between the side surface and the bottom surface each of the rollers is chamfered so as to form a corner surface. Accordingly, if these rollers are used in a cross roller bearing, the bottom surfaces of the rollers make contact with a right angle groove which is therefore scratched, and accordingly, a problem of accelerating abrasion in both rollers and the right angle grooves occurs.

Accordingly, the applicant has also improved the cross roller bearing, and as a result, has completed a cross roller bearing that can suitably used for repetitions of vertical linear motion.

Figure 13:
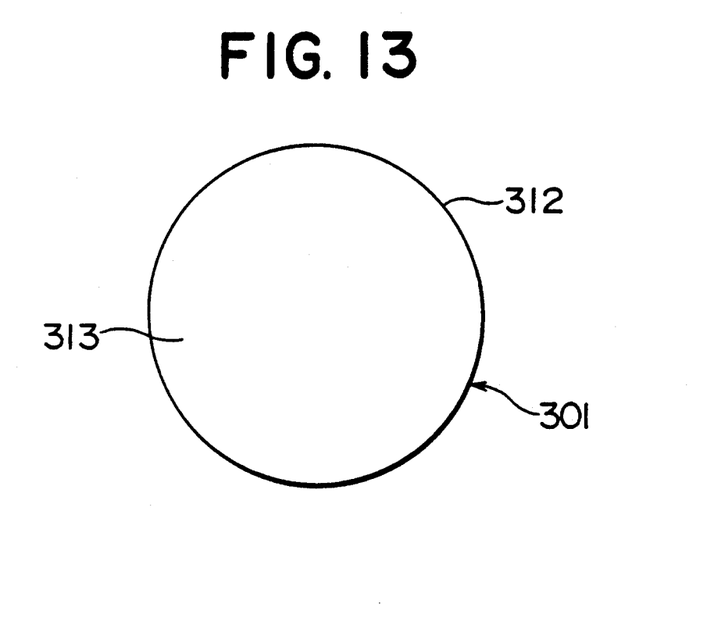
FIG. 13 is a plan view illustrating a roller constituting a retainer of the press die set.
Figure 14:
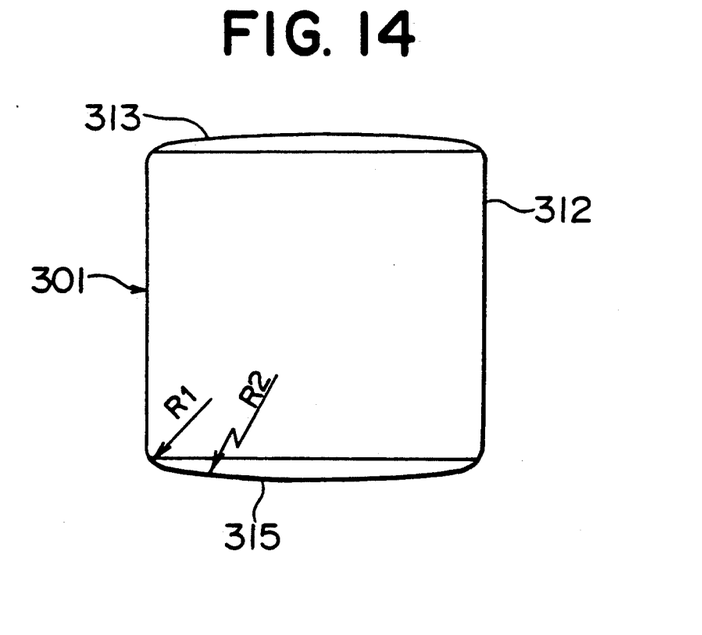
FIG. 14 is a front view illustrating a roller constituting a retainer of the press die set.

In a cross roller in one embodiment form, the upper end surface 313 and lower end surface 315 of a substantially cylindrical roller 301 are convexo-spherical, respectively, as shown in FIGS. 13 and 14. The centers of the spherical surfaces are located on the rotational axis of the column, and the radius of curvature of the spherical surfaces subraces is 2.5 times as large as the diameter of the column. Further, the boundaries between the upper and lower end surfaces 313, 315 and the side surface 312 of the roller is defined by a curve having a radius of curvature of 0.2 mm.

Figure 15:
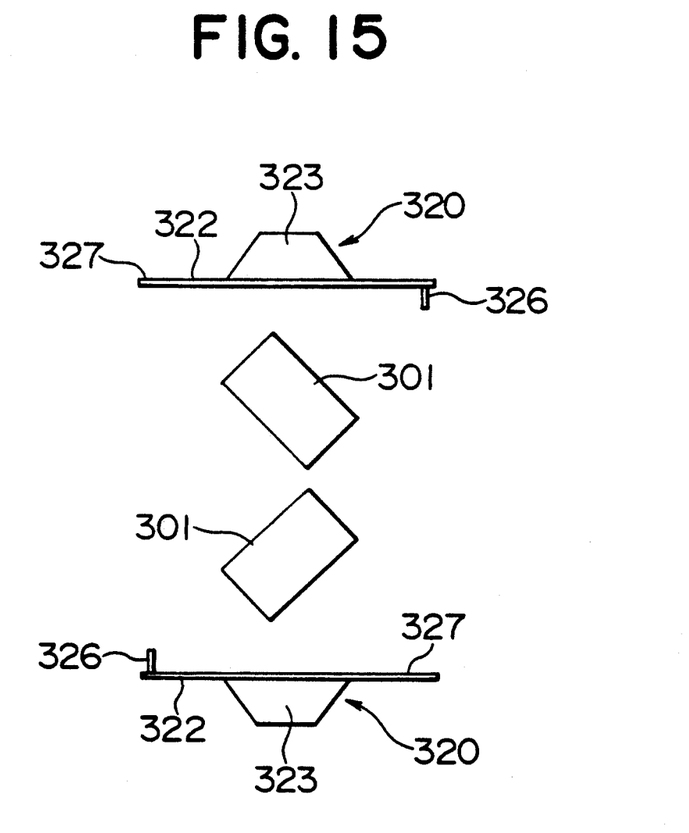
FIG. 15 is a schematic view illustrating a frame constituting a retainer of the press die set.
Figure 16:
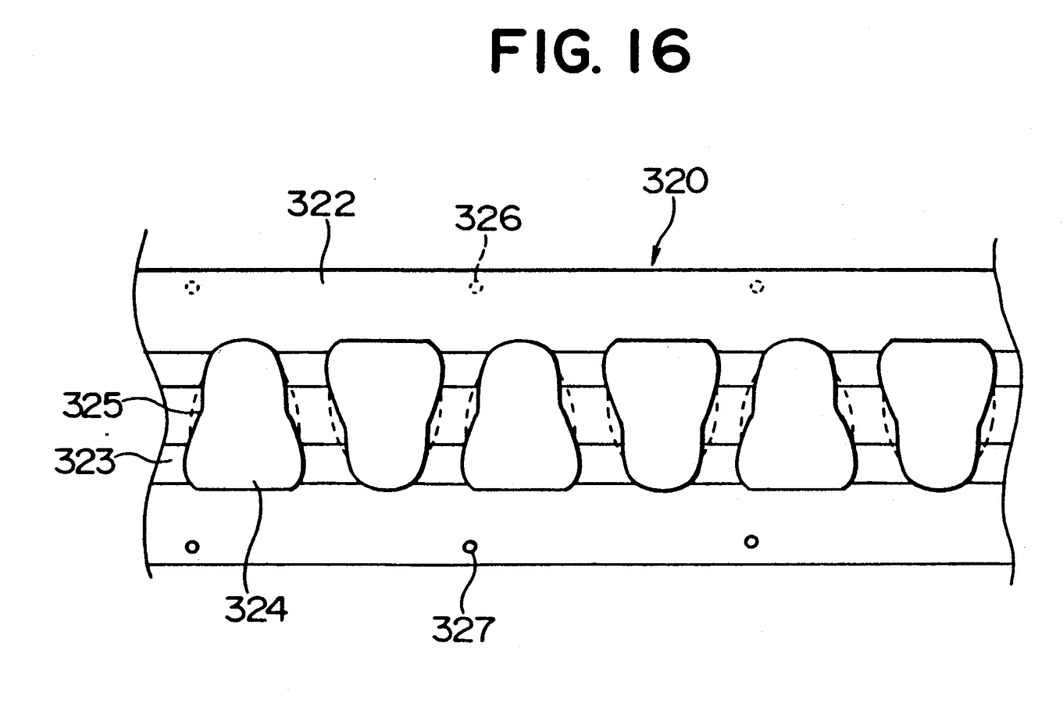
FIG. 16 is a plan view illustrating a frame constituting a retainer of the press die set.
Figure 17:
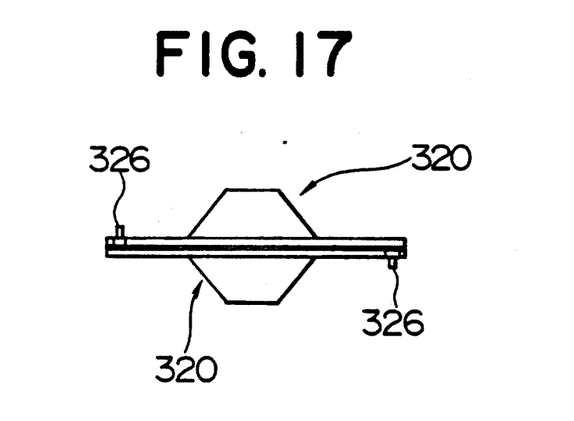
FIG. 17 is a front view illustrating an assembly of a cross roller bearing constituting a retainer of the press die set.
Figure 18:
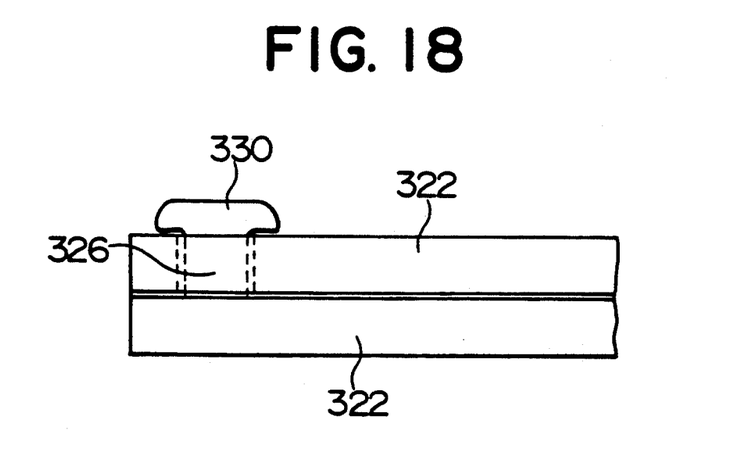
FIG. 18 is a front view illustrating a part of a cross roller bearing constituting a retainer of the press die set.

Further, a frame for the cross roller bearing in this embodiment is made of nylon group material, polyacetal group materials, or resin group materials from which lubricant oozes out, and is composed of members 320 having the same shape which vertically bi-split the thickness of a frame flat part 322 as shown in FIG. 15. The frame also has, in its center part, a storage part 323 for rotatably holding the rollers in such a positional relation that the axes of each adjacent rollers are twisted by an angle of 90 deg., by means of a part 325. As shown in FIG. 16, a specific side surface of the roller storage part 323 is formed therein an aperture 324 so as to allow the side surface of a roller to make contact with the guide post or a guide bushing. A protrusion 326 and a hole 327 are formed on the frame in the vicinity of the edge of the flat plate part 322. As shown in FIG. 17, the members 320 of the frame are assembled together with the protrusions 320 and the holes 327 being fitted together, and then the end parts of the protrusions 320 are thermally deformed so as to prevent the protrusions 320 from coming off, as shown in FIG. 18. The thermally deformed part 330 of the protrusion is as shown.

Figure 19:
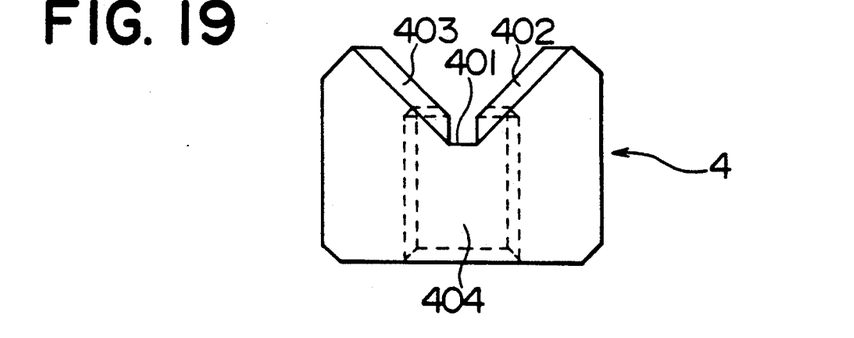
FIG. 19 is a front view illustrating a guide block of the press die set.
Figure 20:
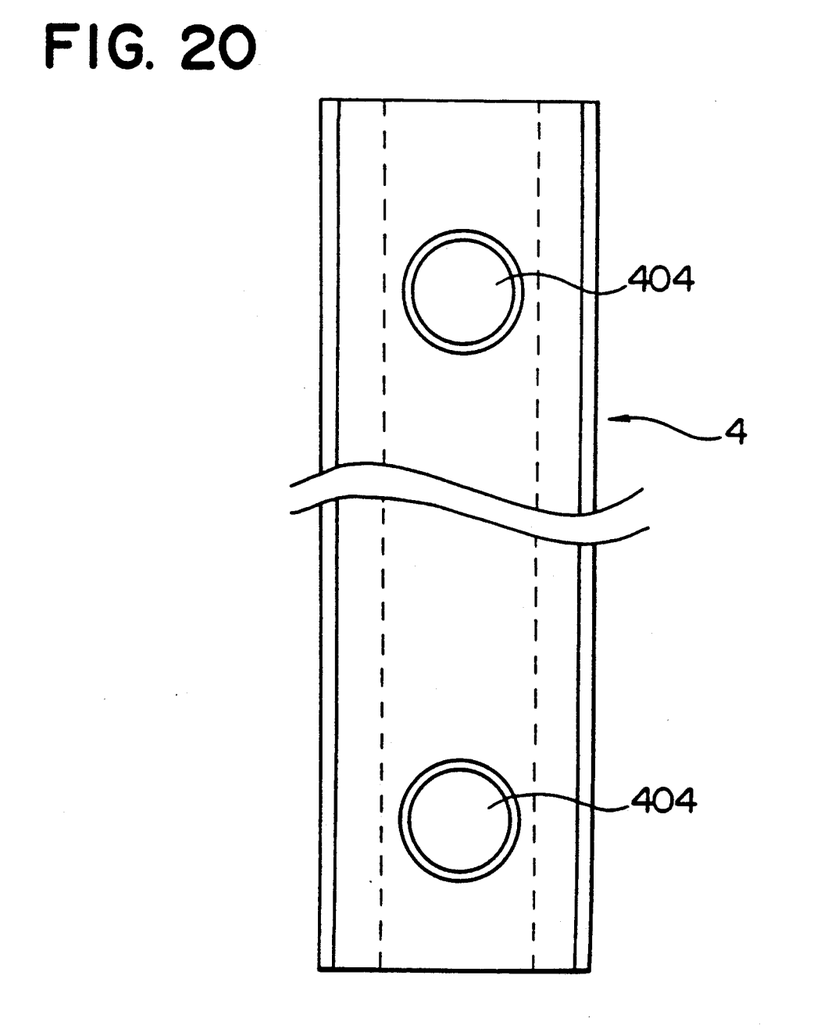
FIG. 20 is a plan view illustrating a guide block of the press die set.

FIGS. 19 and 20 are front and plan views, respectively, illustrating a guide block in an embodiment form. The guide block is formed therein with a right angle groove 401 in which two flat surfaces 402, 403 making an angle of 90 deg. therebetween are precisely formed. A thread hole 404 is formed in the guide block at a surface on the side remote from the right angle groove 401. Thus, the position of the guide block can be microadjusted by means of a screw screwed in the thread hole 404.

The cross roller bearing makes contact with the right angle groove 101 (refer to FIG. 2) formed in the guide post, and also makes contact with the right angle groove 401 formed in the guide block (refer to FIG. 19), and accordingly, allows the guide post and the guide block to perform translational motion, relative to each other, while maintaining a constant space therebetween.

Figure 21:
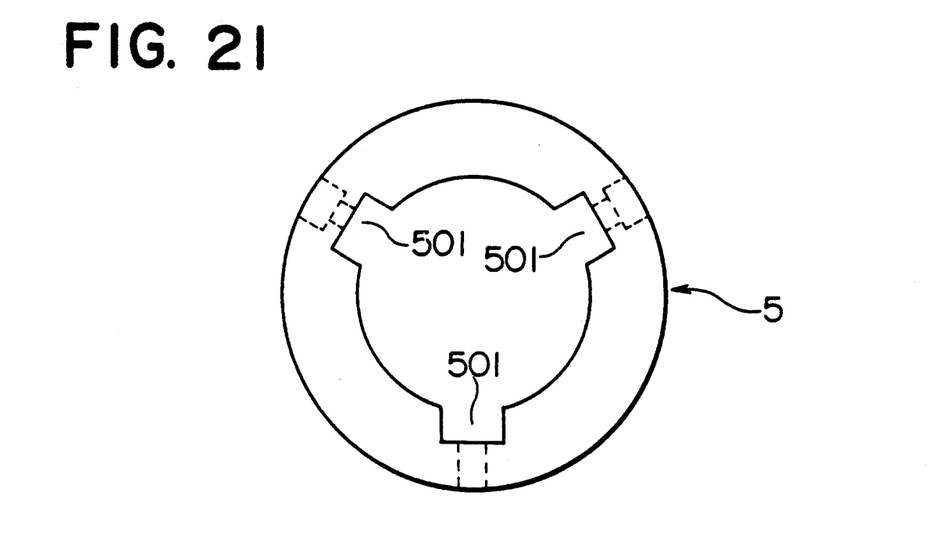
FIG. 21 is a plan view illustrating a guide bushing of the press die set.
Figure 22:
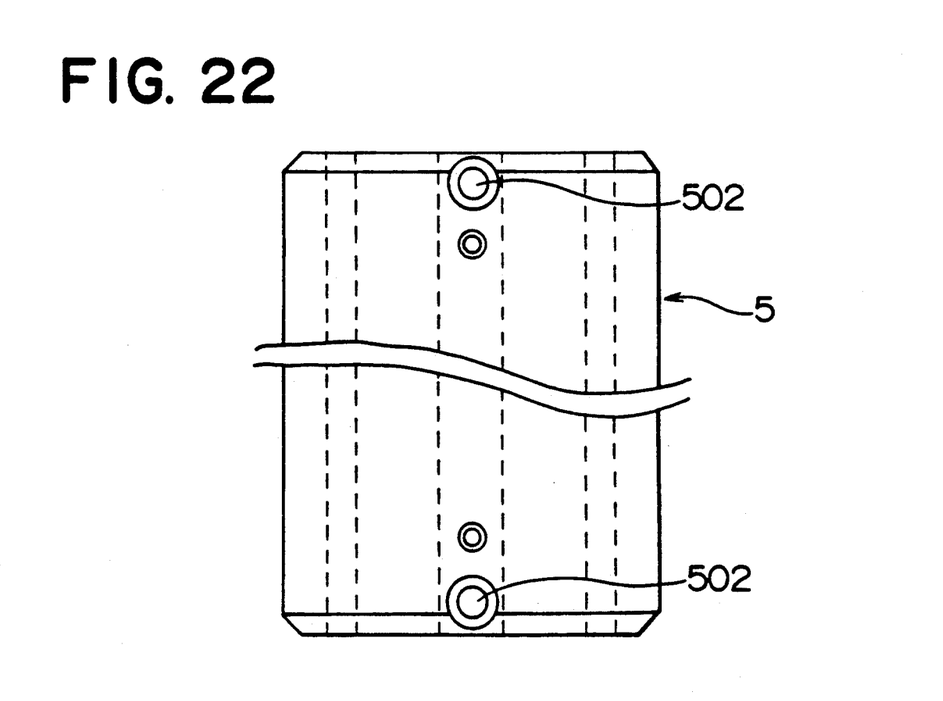
FIG. 22 is a front view illustrating a guide bushing of the press die set.

FIGS. 21 and 22 are plan and front views, respectively, illustrating a guide bushing in one embodiment form. The guide bushing 5 is substantially cylindrical, and has its inner surface which is formed therein with rectangular grooves 501 for holding and securing the guide block, an angle of 120 deg, being made therebetween. The guide block is fitted in these grooves 501 and tightened by a screw. Further, the guide bushing 5 is formed therein with a through-hole 502 through which the positional adjusting screw for the guide block pierces.

The guide bushing is secured to a base opposite the base to which the guide post is secured. That is, for example, if the guide post is secured to the lower base, the guide bushing is secured to the upper base. The relative positional accuracy between upper and lower dies in the X-axial and Y-axial directions are mainly given by the guide post and the guide bushing, and the translational motion of the upper and lower dies in the Z-axial direction (vertical direction) is smoothly made, mainly, by the cross roller bearing.

The press die set according to the present invention, offers the following remarkable advantages, due to the provision of the right angle grooves formed in the guide post, the cross roller bearing and the right angle grooves formed in the guide bushing:

(1) Each of the rollers of the cross roller bearing and the associated right angle groove formed in the guide post are made into line-like contact with each other, different from the conventional one in which they are made into point-contact with each other, and the contact lines thereof make a right angle therebetween. The same can be said to the contact between each roller and the right angle groove formed in the guide bushing. Accordingly, the positional accuracy between the upper and lower dies in the X-axial and Y-axial directions does not vary substantially during sliding motion. As a result, substantially no such a trouble as chipping or eccentric abrasion of a punching cutter occurs.

(2) It is dynamically understood that the resultant of the contact forces of the cross roller bearing and the right angle groove is directed in the direction of the bisector of the angle between the two surfaces of the right angle groove. If the bisector of the two surfaces of the right angle groove is set so as to pass through the axis of the guide post, the positional adjustment for the upper and lower dies in the X-axial and Y-axial directions can be facilitated.

(3) Since substantially no eccentric load and eccentric contact occur between the guide post and the cross roller bearing, overheat and eccentric abrasion of the guide post do not occur. Accordingly, long time operation can be ensured, and further, the maintenance can be facilitated.

(4) It has been found that the durability of a cross roller bearing is about seven to ten times as great as that of a ball bearing, and as a result, the press die set according to the present invention is excellent in durability and shock resistance.

What is claimed is:

1. A sliding bearing assembly for a die set comprising:
a guide post having an outer surface in which are formed at least two V-shaped grooves disposed parallel to the axis of said guide post, each of said grooves being defined by two flat surfaces making a 90 degree angle therebetween;
a guide bushing comprising a cylindrical member having an axial bore in the inner wall of which are formed at least two V-shaped grooves disposed parallel to the axis of said cylindrical member and opposing the grooves in said guide post, each of said grooves being defined by two flat surfaces making a 90 degrees angle therebetween, said guide bushing being mounted on said guide post so as to provide relative linear movement therebetween; and
a substantially cylindrical retainer assembly positioned within the bore of said guide bushing and comprising at least two cross roller bearings both mounted on a generally circular frame consisting of interconnected coupling members with the roller of each of said cross roller bearings arranged to engage and travel in respective grooves in said guide post and in said guide bushing.

2. The sliding bearing assembly according to claim 1, wherein said guide post and said guide bushing each have three uniformly distributed V-shaped grooves formed therein.

3. The sliding bearing assembly according to claim 1, wherein said at least two V-shaped grooves in said guide bushing are each formed in a respective guide block adjustably secured in the bore of said cylindrical member.

4. The sliding bearing assembly according to claim 1, wherein the frame of said retainer assembly comprises a plurality of curved coupling members equal in number to the number of cross roller bearings in the assembly, each of said coupling members having first and second ends and each consisting of two interfitted parts, means connecting the first end of each coupling member to a first side of a frame of a first of said cross roller bearings, and means connecting the second end of each coupling member to a second side of a frame of a second of said cross roller bearings, said coupling members having a curvature which causes the assembled coupling members and cross roller bearings to correspond to the curvature of said retainer assembly.

5. The sliding bearing assembly according to claim 1, wherein the interconnected coupling members of the frame of said retainer assembly comprise at least two interconnected like sectors of a flat annular ring, wherein said annular ring has a groove formed therein along the inner edge thereof at the location of each interconnection of two sectors for receiving a frame of a respective cross roller bearing, and wherein said annular ring has coupling parts formed on the flat surface thereof arranged to engage corresponding coupling parts on another like annular ring, whereby a retainer assembly of cylindrical shape may be constructed by stacking a plurality of annular rings with frames of cross roller bearings mounted thereon, in which the cross roller bearing frames have circumferential play.

6. The sliding bearing assembly according to claim 1, wherein each of said cross roller bearings has a frame on which a roller is supported and comprises first and second members made of resin and having the same shape disposed parallel to each other face-to-face.

* * * * *